3,329,799
SYSTEM FOR HEATING, TESTING AND DESTROYING FILAMENT WOUND CONTAINERS
Robert J. Carmody, 501 Edgemont Drive,
Huntsville, Ala. 35811
Original application Mar. 27, 1963, Ser. No. 268,502, now Patent No. 3,290,197, dated Dec. 6, 1966. Divided and this application Apr. 5, 1965, Ser. No. 445,804
4 Claims. (Cl. 219—200)

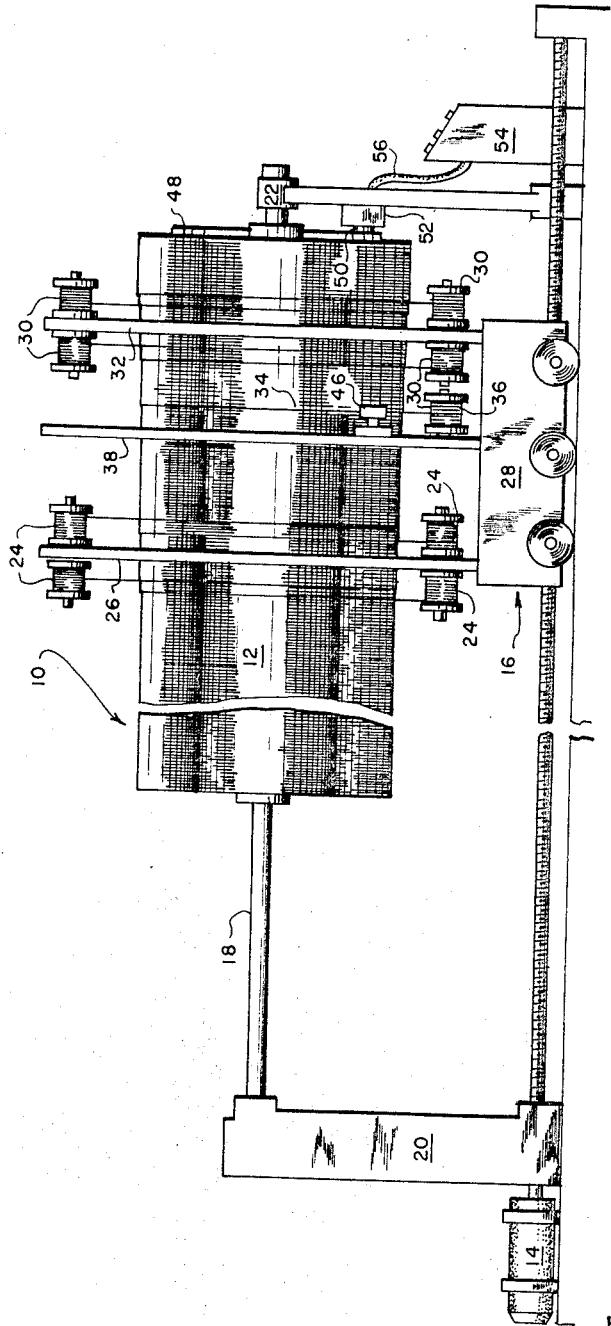

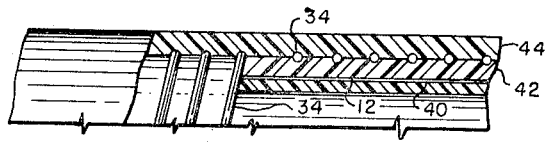
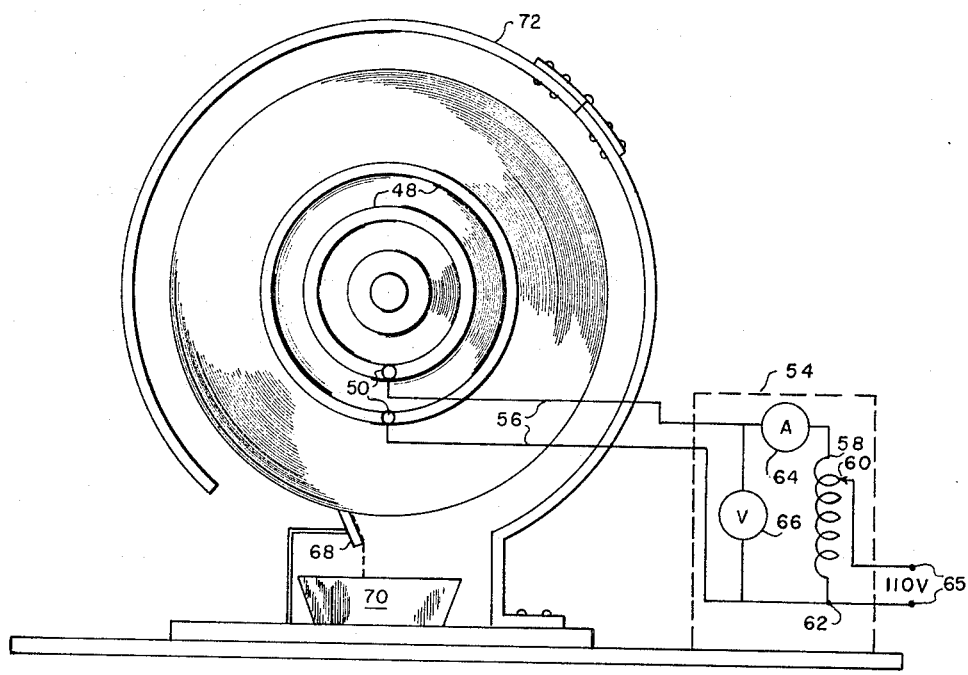
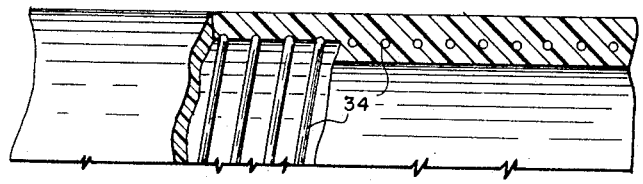

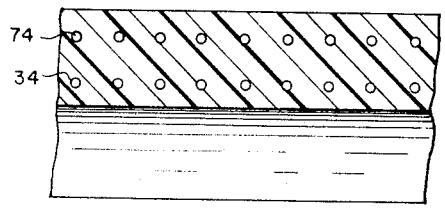
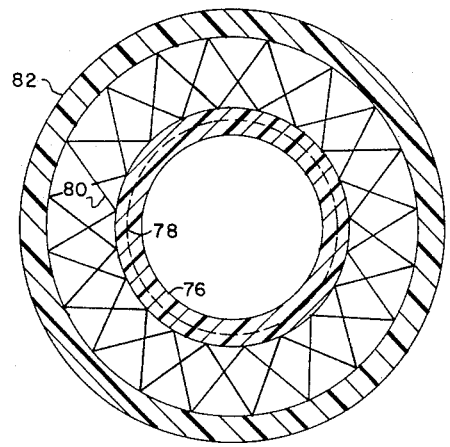
FIG. 5
FIG. 6
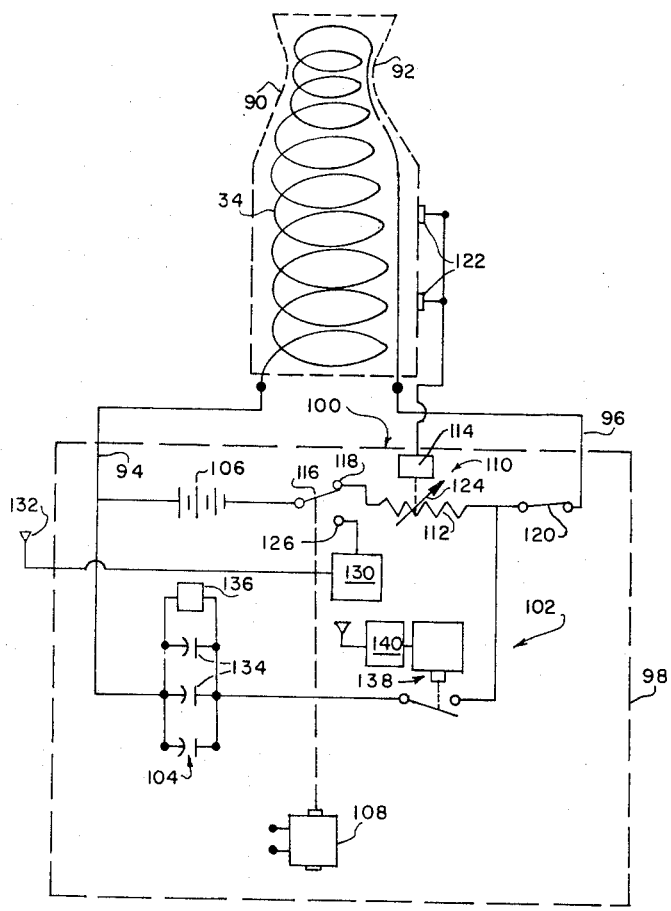
FIG. 8
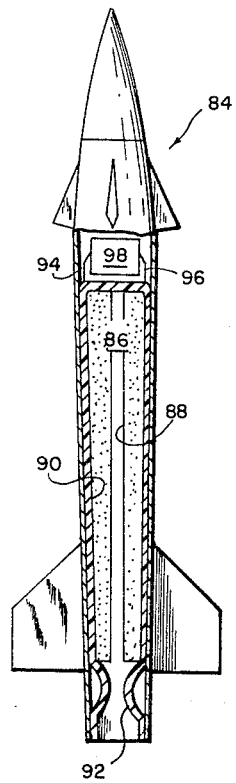
FIG. 7
ROBERT J. CARMODY,
INVENTOR.
BY
ATTORNEYS

ABSTRACT OF THE DISCLOSURE

A system for heating, testing and destroying filament wound containers with an electrical conducting strand incorporated within the wall of the filament wound container so that a current is passed through the conductor to heat the container. A resistance sensing means is incorporated in the system for sensing resistance changes in the conductor and thus monitoring strains induced in the container resulting from pressure exerted on the container. The system includes a plurality of storage capacitors that may be charged to dump a large current through the conductor so that the conductor will explode or vaporize with a force sufficient to destroy the container.

This application is a division of copending application Ser. No. 268,502, filed Mar. 27, 1963, now Patent Number 3,290,197, issued Dec. 6, 1966.

The invention described herein may be manufactured and used by or for the Government of the United States of America for governmental purposes without the payment of any royalties thereon or therefor.

This invention relates generally to improvements in containers and the method of manufacturing the same. More particularly, this invention relates to the manufacture and use of filament wound plastic vessels containing a filamentary electrical conductor that is suitable for both curing the vessel and for later incorporation into electrical control circuits.

The number and types of storage vessels and tanks required to meet industrial, military and domestic requirements has substantially increased within recent years. The demand has been particularly great for vessels or tanks that are lighter, stronger, and substantially larger than those that have previously been available. This demand for new types of storage units can be attributed in a large degree to the advent of the rocket era which, needless to say, has brought to light numerous problems in handling and storing various liquid and solid materials which were heretofore unknown or of little concern. This is particularly true in the case of the rocket vehicle itself which requires numerous storage tanks and tubing of various sizes and shapes all of which must be extremely light, strong, corrosive resistant, and yet have a high impact or shatter resistance. Furthermore, since the various propellant tanks, thrust chambers and compressed gas bottles used in the rocket will be subjected to a wide range of varying temperature both during storage and operation, the material from which they are fabricated should have a low thermal conductivity to insure the best possible operation of the rocket.

Due to the suddenness with which the rocket era emerged and its rapid advancement, various metals and alloys were the only materials available from which the tanks and other vessels utilized in these early rockets could be fabricated even though most of these materials were not completely satisfactory for this purpose. Besides being excessively heavy and thus reducing the payload of the rocket, these metal tanks generally exhibited a high thermal conductivity, were very susceptible to damage by corrosion and had little or no shatter resistance. Such things as scratches, poor or mismatched wild seams and other types of flaws common in metal tanks were also a source of concern since they brought on notch-sensitivity or other like weaknesses which greatly decreased the reliability of the tanks.

In an effort to increase the construction and reliability of each metal tank, special techniques and a very rigid inspection program were followed. Even though this resulted in a better and more reliable metal tank being produced it also greatly increased the cost of these tanks and all but prohibited their being mass produced.

As the state of the rocket art developed and each launch vehicle became increasingly large and complex, it became obvious that reliability of the numerous tanks used in the launch vehicle would have to be increased while their weight and cost were reduced. These requirements practically ruled out the use of any known metal, alloy or fabrication steps heretofore used in forming rocket fuel tanks. Therefore, in an effort to produce a tank or container that possessed many of the desirable features associated with metal tanks yet which exhibited none of the undesirable features thereof, tanks fabricated from various types of plastics were made and tested. Although some of these plastic tanks were acceptable for certain uses they generally failed to withstand the unusually high pressures normally encountered in rocket systems. Even the incorporation of certain reinforcing materials within the extruded plastic tanks failed to completely eliminate these pressure failures.

Filament wound vessels were then tried and found to be nearly ideally suited for use in rocket systems. These filament wound tanks were particularly well suited for use in those parts of the rocket systems that operated under high pressures such as the fuel tanks or nozzle systems since they are extremely light, strong, corrosive resistant, and exhibit a high impact or shatter resistance. Furthermore, since these filament wound tanks are formed by winding a reinforcing material such as glass roving and a resinous binder around a mandrel of suitable shape, they exhibited none of the notch-sensitivity or welding problems that were commonly encountered in metal tanks.

There are, however, certain fabrication procedures that have been employed in the forming of filament wound tanks which have greatly restricted or, in certain instances, prohibited their use notwithstanding their generally superior properties when compared to tanks fabricated from other materials. The first limitation and perhaps the most difficult to overcome relates to the "curing" of the filament wound tanks.

As is well known, filament wound tanks are formed by wrapping a filamentary reinforcing material around a form having the general shape of the tank to be fabricated. As is obvious, these individual wraps or strands of the "roving" or reinforcing material must be bonded together into a solid, unitary vacuum-tight mass before these tanks are of any value as a fluid container. This bonding together of the individual strands of the roving material is generally accomplished by first impregnating the roving with a suitable resinous binder and then applying heat to the impregnated roving thereby causing the binder and roving to cure into a unitary mass.

This heating or curing step has heretofore required the use of a suitably sized oven or like heat producing enclosure that, of necessity, had to be slightly larger than the wound tank that was to be cured. Obviously, as the size of the tank to be cured increased in size the overall size of the curing enclosure had to increase by a proportional amount.

In those cases where an exceptionally large tank was to be produced such as, for example, a propellant casing for a 240 inch solid booster unit, the cost of building a curing enclosure becomes practically prohibitive. This was especially true during the design or mock-up state of fabricating a filament wound tank since later test or design considerations often dictated a change in the size and/or shape of the unit so that the original heating enclosure could no longer be used and thus had to be discarded. This type of curing, therefore, of necessity adds greatly to the time, labor and expense involved in producing a vessel of the filament wound type.

Yet another disadvantage of prior storage tanks or containers and particularly those of the filament-wound type is that of maintaining the temperature within a container above a preselected level. Some method of maintaining the temperature within a container above a preselected level is generally desirable and in those cases where the container is used to store solid propellants, which must be maintained within a limited temperature range if they are to retain their propellant and instantaneous ignition characteristics, this control is a necessity. In the past it has been the accepted practice in controlling the temperature of containers used in rockets to either heat the complete housing in which the container and rocket is stored or include a separate heating unit around the outer surface of the container itself. Besides being excessively large, heavy and bulky, both of these methods have only been partially satisfactory and have generally wasted an enormous amount of heat.

In those cases where the filament-wound tank is included as a part of the rocket or propulsion system of a launch vehicle or rocket, it becomes necessary that some failure warning system be operatively connected to the vessel as a safety precaution. This failure warning system is necessary to detect any bursting, burning through, or other type rupture of the tank wall in time for the rocket engines to be shut down or other appropriate measures taken to prevent an explosion from occurring. Such a warning system is an absolute necessity in those cases where the launch vehicle or rocket is being used to boost a manned space capsule into space, since the system is relied upon to give sufficient warning of a component failure to permit the capsule to be jettisoned clear of the main rocket before the failure destroys the rocket.

Previously such failure warning systems consisted, for example, of sensing devices placed around the outer surface of the tanks and connected to a main pickup circuit. Although such systems were generally successful for their intended purpose they nevertheless were difficult to install and maintain which, in turn, unduly increased the expense of producing launch vehicles. The additional weight of the systems also reduced the effective payload of the rocket.

It has also been the practice in the past to provide each launch vehicle with a unit capable of destroying the vehicle upon receiving a proper command should it veer away from its predetermined flight path. These destructive units are normally of the explosive type and are placed near or around the propellant containers or tanks of the vehicle to assure that the highly explosive propellant material is destroyed before it falls back to earth. Again, these destructive systems are bulky, heavy, difficult to install and somewhat dangerous since there is always the possibility of a premature or accidental operation.

According to the present invention, it has been found that a superior filament wound container or tank can be fabricated without the use of a curing oven or enclosure. This is accomplished by winding or interweaving an electrical conductor between various layers of the reinforced roving as the roving is being wound upon a mandrel. Once the container being fabricated is completely wound upon the form an electric current is applied to the conductor thereby causing the resinous binder and roving to bake or cure into a solid unitary structure.

The electrical current is now turned off and the mandrel removed from the container. Since the electrical conductor employed to cure the filament wound container is baked into and forms an integral part of the container it can be used to (1) heat the container during storage, (2) serve as the detector element of a failure warning system by conecting the lead-out terminals of the conductor to a suitable alarm circuit, and (3) as an explosive bridgewire for destroying the container by applying a large current pulse to the conductor if such became necessary or desirable.

As will be readily apparent, the expense involved in producing a container of any desired size or shape is greatly reduced since no special oven or heating structure is required. This, in turn, permits the expense of fabricating a rocket using such tanks to be reduced not only because of the reduction in the cost of the individual containers but also because the electrical conductor wound within the container can be used to replace several necessary circuits heretofore incorporated into the rocket as individual units. The replacement of these several individual units also reduces the weight which the rocket must lift thereby increasing its payload and reliability.

Therefore, the primary object of this invention is to provide a new method for producing filament wound containers.

Another object of this invention is to provide a filament wound container which has electrical conductor means located therein.

Yet another object of this invention is to provide a rocket having containers of the filament wound type which have an electrical conductor wound therein for controlling or monitoring the conditions of the container.

These and further objects and advantages of this invention will become more apparent upon reference to the following specification, appended claims and drawings wherein:

FIGURE 1 illustrates somewhat diagrammatically one form by which a filament wound container incorporating an electrical conductor can be fabricated;

FIGURE 2 is a longitudinal view, partially in section, illustrating a filament wound form containing an electrical conductor wound upon a mandrel prior to the curing of the form;

FIGURE 3 illustrates somewhat diagrammatically the curing of a filament wound container by connecting a source of current to the output terminals of an electrical conductor wound therein;

FIGURE 4 is a longitudinal view, partially in section, illustrating a filament wound container after it has been cured by heat emitted from the electrical conductor embedded therein;

FIGURES 5 and 6 illustrate other forms of filament wound containers that can be made according to the apparatus and method of the present invention;

FIGURE 7 is a longitudinal view, partially in section, of a rocket utilizing a filament wound propellant tank and nozzle having an electrical conductor wound therein and used as one element of an electrical circuit; and FIGURE 8 is a circuit diagram of one type of electrical control circuit that is adapted for heating, monitoring and destroying a filament wound container by means of the electrical conductor wound therein.

In order to better understand the construction and use of this novel filament wound container it will be described in connection with a rocket vehicle. It is to be understood, however, that various other uses may be found for the container. For example, containers constructed in accordance with this invention give superior results when used as vessels for piping or transporting liquids, as heater containers or as external housing structures. Other assorted fluid containing or housing structures in which this invention can be readily adapted for use will be apparent to those skilled in the art.

With reference to the accompanying drawings wherein like reference numerals designate similar parts throughout the various views, and with initial attention directed to the embodiment of the invention as shown in FIGURE 1, reference numeral 10 is used to generally designate one type of winding machine upon which a reinforced filament can be wound and cured to form a container of a preselected size and shape. The winding machine comprises, in general, a mandrel or form 12, a power source 14 and a spool carriage assembly 16.

The mandrel 12 normally employed in the winding machine 10 has the dimensions and physical shape of the inner surface of the article to be fabricated and is, generally, of the collapsible type to facilitate removal of the vessel once it is finished. Although it is possible to wind the reinforced roving and electrical conductor around the mandrel 12 in various manners, it is preferable that this winding step be accomplished by rotating the mandrel while the roving and conductor is played out along the mandrel surface as will be more fully explained hereinafter. To permit the mandrel 12 to rotate it is mounted upon a suitable support shaft 18 which, in turn, is rotatably mounted at each end on support columns 20 and 22. The power source 14, which is shown as an electrical motor and is provided for operating the winding machine 10, is connected through suitable drive means such as, for example, a pulley and belt arrangement located within the support column 20 for rotating the shaft 18 and thus the mandrel 12.

The reinforced roving and electrical conductor from which the filament wound vessel is formed can be wound upon the mandrel 10 by using essentially one or a combination of three basic winding patterns. These patterns are (1) helical winding, (2) sequential winding, and (3) circumferential winding. In helical winding, the roving and conductor filaments are laid down upon the mandrel at some angle to the axis depending upon the particular design configuration employed. As the roving filament is laid on the surface of the mandrel, it traces a helical path and, as the filament goes around the mandrel for the second time, it is spaced a certain distance away from the first strand that has been laid down. This spacing is dependent upon the winding angle and the size of the part being fabricated. By a proper arrangement and operation of the winding machine, these spaces are eventually filled in as subsequent revolutions of filament are wound in place. The electrical conductor is now wound upon the mandrel and another layer of roving is placed over the mandrel just prior to the conductor being heated to cure the vessel.

The second method of winding, designated sequential, is similar to helical winding except that each time a pass around the vessel is made the roving filament is laid down next to the previous one. Although this method of winding can be accomplished on the same type of machines that are used for helical winding, it is much simpler to wind in this manner with what is known as a polar wrapping machine. With this type of machine, a rotating arm carries the strand around the poles of the part at a relatively high speed while the mandrel is rotated at a relatively slow speed so that for a single revolution of the arm the mandrel will rotate only that amount necessary to provide the desired width of spacing.

In circumferential winding, which is the simplest of the three basic types and the one that is illustrated in FIGURE 1 for purposes of clarity, the roving filaments are placed on the mandrel at approximately 90 degrees to the axis of the part being wound. To accomplish this circumferential winding a first group of coils or spools 24 of roving material is mounted on a support arm 26 attached to a longitudinally movable spool carriage assembly 28 as seen in FIGURE 1. A second group of coils or spools 30 of roving material is likewise mounted on a supporting arm 32 attached to the carriage 28. The carriage 28 is attached to the power source 14 by a suitable drive shaft 30 so that, as the mandrel 12 rotates and thus wraps the roving material around its surface in adjacent layers, the carriage 24 is moved transversely along the length of the mandrel. The electrical conductor 34 used to cure the impregnated roving material is carried on a spool 36 by an arm 38 which is located between the arms 26 and 32 so that the conductor will be embedded at a suitable depth within the roving as better shown in FIGURE 2.

In reference to FIGURE 2, the mandrel 12 is shown coated with a suitable release or parting material 40. The first layer of reinforced and resinous impregnated roving formed by the filaments carried on spools 24 is represented at 42 while the layer formed by the roving carried on the spools 30 is shown as 44. As can be seen in this figure, the electrical conductor 34, which is shown in the form of a wire, is wound so as to be slightly spaced apart and embedded approximately equal distance from the outer surfaces of the two layers of rovings 40 and 44.

The reinforcing materials used to form the layers of roving 40 and 44 basically fall into two categories; namely, the reinforcing material and the resin system. Within each category there are numerous materials which can be used for filament winding. For pressure vessels constructed in accordance with the teaching of the present invention, the reinforcing material is preferably glass filaments with an epoxy resin binder. In choosing the particular reinforcing glass or roving to be used, four factors must be taken into account. These are tensile strength, modulus of elasticity, wet-strength retention and fatigue properties.

The choice of an epoxy-resin system for filament winding is mainly dictated by strength considerations with the exact choice of a resin system to be used in fabricating each pressure vessel being determined largely by the room-temperature properties, elevated-temperature properties, cure time, and temperature and resin-handling characteristics.

As mentioned hereinabove, the reinforcing roving material must be impregnated by a suitable resinous material. This impregnation can be accomplished by any one of three methods. The first, that of winding with a dry roving material and impregnating it once it is on the mandrel, has been discarded since the strength properties attainable by this method of impregnation has proved to be poor.

The second method of impregnation is known as wet winding. In this system, the reinforcing material is drawn through a resin bath just prior to being wound on the mandrel. This method of impregnation, although producing parts with satisfactory strength, is rather messy and does impose serious speed limitations because of the difficulty of obtaining adequate impregnation at extremely high speeds.

The third method of impregnation and the one that is preferred in the present invention involves a preimpregnating process. In this process, the resin is impregnated into the reinforcing roving material and partially cured. This impregnated material is then rewound on a spool for use in the filament winding operation. The resin content of a filament wound part will thus be substantially the same as the resin content of the impregnated strand.

In determining the type and size of electrical conductor that is to be employed in curing the filament wound parts, certain basic requirements which the conductor must meet has to be considered. The first and most important of these requirements is that the conductor must be capable of generating sufficient heat to cure or set the resinous binder and roving material when current is applied to its terminals. The size or diameter of the conductor should not be excessively large, however, since this would cause the strands of the filament located adjacent to the wire to be spaced apart by an excessive amount thus producing air pockets which, in turn, decreases the strength of the unit. It has been found that conductors having a diameter of from .005–.020 inch have generally given excellent results when used with No. 20N glass roving. In those cases where the conductor is to be used for other purposes after the curing cycle is completed such as, for example, where the conductor is to be used as a bridge wire for destroying the container, any requirement unique to these uses must also be taken into consideration in selecting the conductor.

Although the electrical conductor is generally made of metal and in the form of a circular wire, it is to be realized that the conductor can be made of any suitable material and in various shapes. For example, a glass carrier filament or strand can be impregnated or coated with carbon or metal particles thus rendering it conductive and suitable for use as an electrical conductor in a filament wound container.

At first glance, the manner in which a filament wound tank is constructed in accordance with this invention appears deceptively simple. It might appear that the process consists merely of alternately winding a layer of reinforcing material containing a resinous binder and a layer of an electrical conductor around a mandrel to form a part and then curing the form by passing current through the conductor. In a sense, the process is rather simple in comparison to other processes used to form tanks and this fact greatly adds to the desirability of the new process. It is, however, extremely important that certain steps be followed during the winding and curing of the tank if it is to exhibit the best characteristics that are attainable. Besides carefully selecting the roving and conductor materials that are to be used, it is necessary that these materials be wound onto the mandrel in the following manner for best results.

First, the mandrel 12 (FIGURE 1) to be wrapped should be secured to the support shaft 18 and checked to see that it is in alignment and rotating concentrically. The spool carriage assembly 28 is moved to the extreme right-hand end of the shaft 30 and the roving carried on the spools 24 is fed to the right-hand end of the mandrel 12 and a few wraps made by hand before the drive mechanism 14 is engaged. It has been found that the best winding results are obtained when the spools 24 of roving are allowed to rotate under a slight tension of approximately 10 pounds. A friction or magnetic clutch arrangement can be used to achieve the desired tension.

The drive mechanism 14 is now engaged and the transverse rate of travel of the spool carriage assembly 28 is adjusted to lay down the roving in the desired pattern and thickness onto the mandrel 12. After the carriage assembly has advanced far enough down the mandrel 12 till the spool 36 carrying the electrical conductor 34 is lined up with the right end of the mandrel, the drive mechanism 14 is temporarily shut off till the conductor strand is started upon the mandrel.

Even though a container can be formed that is suitable for certain uses by winding the electrical conductor upon the mandrel in its natural or cold state, far superior containers are produced if the wire is preheated just prior to or as it is being wound upon the first layer of roving. The temperature range between 90 degrees and 150 degrees Fahrenheit has been found to be acceptable for preheating the conductor.

This heating of the conductor causes it to elongate in a manner that is well known in the art. The elongated conductor will thus exhibit little or no further creepage or expansion when it is later heated to cure the filament wound container. If the conductor was wrapped upon the mandrel while it was in a "cold" state then, when a current was applied to the conductor thus causing it to heat and expand, the conductor would exert an internal force upon the container which might, under certain conditions, cause it to crack or otherwise be weakened. Any suitable method can be used to preheat the conductor such as a heating element and is represented at 46 in FIGURE 1.

In order to prevent any shorting from occurring between the surfaces of adjacent turns of the electrical conductor 34, the conductor should either be covered by an insulative packet or the turns thereof spaced slightly apart. Generally the spacing method of insulating the turns is used if the conductor is not to be wound in an overlapped manner or the roving material is not of resinous coated metal filament type. However, when polar or helical winding is to be used thus requiring that one layer of the electrical conductor 34 be wound on over another, it is necessary to either imbed the electrical conductor in the roving during its manufacture or insulate it with an insulating coating capable of withstanding temperatures of 350 to 400 degrees Fahrenheit.

The roving carried on the spools 30 is now threaded upon the mandrel in the same manner as the roving on spools 24 described hereinabove. With the roving and electrical conductor thus started upon the mandrel as shown in FIGURE 1, the drive mechanism 14 is once again engaged and the rotation of the mandrel 12 and the transverse feed of the roving to the mandrel maintained at a constant speed during the entire winding operation. To increase or decrease the thickness of the filament wound layers, more or less spools of roving can be used or the rotation rate of the mandrel vs. the transverse feed rate of the roving changed by a suitable amount.

As each filament of roving material reaches the left-hand end of the mandrel it is cut and fastened to the metal mandrel or otherwise secured in place. The ends of the electrical conductor 34 are attached to a pair of slip rings 48, however, since an electrical current is to be passed through the conductor to cure the filament wound container. A pair of contact brushes 50 held within a brush housing 52 are mounted so as to bear upon the slip rings 48 in a manner shown in FIGURES 1 and 2.

A variable electrical power supply 54 is connected through lead out cables 56 to the contact brushes 50. This power supply is shown schematically in FIGURE 3 and consists of a variable transformer 58 which has its movable contact 60 and fixed contact 62 connected through output terminals 65 to a standard power line. The lead-out cables 56 are connected to the ends of the transformer 58 and an amp meter 64 is connected in the circuit for monitoring the current flow through the electrical conductor 34 wound in the container. A voltmeter 66 is connected across the cables 56 for indicating the voltage applied to the cables. If desirable, the amp meter 64 and voltmeter 66 can be replaced by a suitable watt meter.

The curing of the filament wound container is accomplished in substantially the following manner. First the mandrel upon which the container is wound is started to rotate and then the variable power supply 54 is turned on and adjusted to give the proper heating of the electrical conductor wound into the container. As the conductor heats due to the flow of current therethrough, the resinous binder material will begin to flow evenly throughout the windings. This flow begins in the vicinity of the conductor and gradually extends to the surface of the container. Any excess resinous binder can be removed by a wiper 68 and catch pan arrangement 70, if such is desirable. The rotation of the mandrel is necessary to assure that even distribution of the resinous binder occurs.

Once the heat produced by the energized electrical conductor 34 has penetrated throughout the filament wound container and the excess resinous binder is removed, the remaining binder will harden to form a unitary vacuum-tight container. To speed this hardening action a heat reflector 72 can be placed around the outer surface of the container as shown in FIGURE 3. This heat reflector is not absolutely necessary, however, since a rather low temperature is all that is required to cure the container if the heat is applied near the center of the winding. For example, a container having a wall thickness of three-eighths inch was cured from the center winding outwardly by raising the heat of the conductor from substantially room temperature to 350 degrees Fahrenheit in one hour and then holding the temperature at this level for one additional hour. The results of this "outward" curing procedure was a container that would withstand substantially greater pressures than like containers that were cured in an oven.

FIGURE 4 illustrates how the individual layers 42 and 44 of roving shown in FIGURE 2 are bonded together about the electrical conductor 34 by the curing or baking step to form a unitary vacuum-tight container.

If it is desirable to fabricate a container having extremely thick walls, the winding procedure described in FIGURE 1 can be repeated thus producing a container having a second electrical conductor 74 as shown in FIGURE 5. Obviously, this winding procedure can be repeated as many times as is necessary to give a container having walls of suitable thickness. In actual practice, however, it will seldom be necessary to use two or more winding procedures since a container wound with 20N glass roving and having a wall thickness of one-eighth inch, which is the thickness normally produced by a single winding operation, will withstand approximately 218,000 p.s.i. before bursting. The exact amount of pressure which a container having a three-eighth inch wall can withstand before bursting is not known, but such a container could not be burst by the equipment now available for such tests. It is believed, however, that such a container would withstand well over 50,000 p.s.i. before bursting.

FIGURE 6 depicts yet another container that can be fabricated according to the present invention, thus illustrating its wide versatility. In this figure, a first inner filament wound container 76 is wound in the same manner as taught in FIGURE 1 with the electrical conductor represented by the dotted line 78. Before the container 76 is cured by heating the electrical conductor 78, an aluminous honeycomb 80 is wrapped around the exterior surface of the container 76 and an outer filament wound layer 82 is placed around the honeycomb 80. As will be noted, the outer filament wound layer 82 does not contain an electrical conductor but is cured by the heat produced by the electrical conductor 78 embedded in the inner container 76. A double wall container of the type illustrated in FIGURE 6 has been found especially desirable for use as tubing or tanks utilized in carrying or transporting certain types of fluids.

As mentioned hereinbefore, the electrical conductors wound within the container can be used for numerous other purposes once the curing step is accomplished. To illustrate certain of these numerous other uses for the electrical conductor, reference is made to FIGURE 7 which shows a rocket 84 that is propelled by a solid motor 86. The propellant 88 for the solid motor 86 is housed within a filament wound container 90 constructed in accordance with this invention. The nozzle or thrust chamber 92 is also preferably of the filament wound type and if desirable may be formed at the same time and as a unitary part of the filament wound container 90. A metal jacket or other suitable outer protective layer 94 can be placed around the filament wound container 90 and nozzle 92 to protect these units from adverse weather or like conditions. The electrical conductor 34 (FIG. 8) wound within the container 90 and nozzle 92 is shown connected by suitable lead-out conductors 94 and 96 to an electrical control circuit 98.

The electrical control circuit 98 shown in FIGURE 8 is only one of many that can be used to control the temperature, monitor the operation, and if necessary destroy the container 90 and nozzle 92, thus destroying the rocket 84. This circuit 98 is constructed of three main units, namely, a temperature control unit 100, an operation monitoring unit 102, and a rocket destruction unit 104.

The temperature control unit 100 is employed for keeping the internal temperature of the container 90 and thus the propellant stored therein at substantially a constant temperature, which is necessary if the rocket is to function properly in cool weather. This temperature control unit 100 consists of a common power supply 106, a double pole-double throw relay 108, and a current control 110 shown as a variable resistor 112 driven by a temperature actuated drive 114. As can be seen in FIGURE 8, the electrical conductor 34 is connected at one end through the lead-out 94 to one terminal of the power supply 106. The other terminal of the power supply 106 is electrically connected to the movable contact 116 of relay 108. With the temperature control unit 100 in operation, the movable contact 116 is engaged with relay terminal 118 thus connecting the power supply 106 to one terminal of the variable resistor 112. The second terminal of the variable resistor 112 is connected through a safety switch 120 and lead-out 96 to the other end of the electrical conductor 34. A plurality of thermistor elements 122 are mounted on the filament wound container 90 and electrically connected to the temperature actuated drive 114 which, in turn, is mechanically coupled to the movable element 124 of the variable resistor 112.

The operation of the temperature control unit 100 can be explained in substantially the following manner. With the safety switch 120 closed the relay 108 will connect the movable contact 116 to the terminal 118 and a current from the power supply 106 will pass through the electrical conductor 34 thereby causing it to heat. The thermistor elements 122 will sense the internal heat of the filament wound container and thus the propellant stored therein caused by the heating of the electrical conductor 34 and will activate the drive 114 thereby causing it to adjust the movable element 124 until the proper amount of current is flowing through the conductor 34 and the temperature within the container 90 is at a preselected level. Obviously any variation in the internal temperature of the container 90 caused by a change in weather, for example, will be sensed by the thermistor elements 122 which, in turn, will activate the drive 114, thereby changing the setting of the movable element 124 until the current flowing through the conductor 34 has been adjusted to again return the internal temperature of the container to its desired value. By using a temperature control unit of this type with the electrical conductor 34 the internal temperature of the container 90 can be monitored within a preselected range thus assuring that the solid propellant stored within the container will burn properly when ignited.

As is well known, it is necessary that the operating condition of the container and nozzle assembly of a rocket, among other things, be monitored continuously from the time that ignition occurs until burnout is reached. This is particularly true where a solid rocket motor is used since the container or casing holding the propellant acts as part of the combustion chamber and is subjected to a very high pressure and temperature. This extremely high pressure and temperature that is produced as the propellant burns may, under certain adverse conditions, result in a hole being burned or otherwise produced through the container or thrust chamber. To monitor the operating condition of the container 90 and nozzle 92, the electrical conductor 34 is connected to the monitoring unit 102 by energizing the relay 108 through suitable means (not shown) thereby causing the movable contact 116 to engage relay terminal 126. The engagement of the contact 116 with the terminal 126 permits current from the power supply 106 to flow through the telemetering circuit 130 of the monitoring unit 102 thereby energizing the circuit.

The telemetering circuit 130 is designed to respond to any variation in the resistance of the electrical conductor 34 such as would result if the conductor 34 was being subjected to a strain or high temperature produced by a weak point in the container 90 being melted away as the propellant within the container is burned. As is well known, any strain on the conductor 34 will result in the resistance of the conductor being raised by a predetermined amount. An antenna or other suitable communication link 132 is connected to the output of the telemetering circuit 130 for relaying the output signals produced by the circuit to a ground receiving system.

In certain instances, such as where a guidance failure has occurred, it is necessary that the rocket be destroyed. It has been found that this can be done most effectively by destroying the container or casing housing the explosive propellant. In the present invention this destroying of the propellant container or casing can be readily accomplished by utilizing the electrical conductor 34 as an explosive bridgewire. The destruction unit 104 used to destroy the filament wound container 90 and nozzle 92 consists of a plurality of high current storage capacitors 134 which are charged to capacity by a power source 136. When the high current stored in the capacitors 134 is suddenly dumped through the electrical conductor 34, the conductor will explode or vaporize with a tremendous force in a manner well known in the exploding bridgewire field. To dump the current from the storage capacitors 134 through the electrical conductor 34 thereby causing it to explode and destroy the container 90 and nozzle 92, a relay circuit 138 is connected in the circuit between the conductor 34 and capacitors 134. The relay circuit 138 can be energized from any suitable control source but for purposes of clarity is shown controlled by a command receiver 140.

It is to be realized that a plurality of electrical conductors similar to conductor 34 can be interwoven into the filament wound container whenever such as desirable or necessary for either curing the container or monitoring and controlling its operation while the container is being stored or is in use.

From the foregoing it can readily be seen that not only does the electrical conductor serve to furnish the heat required to cure the filament wound container, thereby eliminating the necessity of using large curing ovens, but the conductor also serves to eliminate numerous other separate circuits that were heretofore required on rockets. The use of this concept of fabricating containers, therefore, not only gives a superior cured container but results in a container whose use substantially reduces the weight, complexity and expense of a rocket while at the same instance improving its reliability.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description and all changes which come within the meaning and range of equivalency of the claims are intended to be embraced therein.

What is claimed and desired to be secured by the United States Letters Patent is:

1. A system for providing a temperature stable environment, including in combination:
   (a) a filament wound container;
   (b) electrical current conductive means which is capable of generating heat when energized by a source of current formed within the wall of said filament wound container;
   (c) current producing means connected to said conductive means for energizing said conductive means thereby causing heat to be produced;
   (d) variable regulator means connected to said current producing means for varying the amount of current flowing through said conductive means thereby varying the amount of heat being produced and applied to the interior of said filament wound container;
   (e) control means responsive to the internal temperature of said filament wound container connected to said variable regulator means for actuating said variable regulator means so that the heat produced as current flows through said conductor means is adjusted thereby maintaining the internal temperature of said filament wound container at a preselected level;
   (f) resistance sensing and indicating means associated and connectable with said current conductive means and said current producing means for sensing resistance variations in said current conductive means and thus monitoring pressure variations exerted on said filament wound container;
   (g) means for selectively connecting said resistance sensing means to said current conductive means and said current producing means.

2. A rocket motor system, comprising:
   (a) a filament wound propellant container;
   (b) electrical current conductive means formed within the wall of said filament wound propellant container;
   (c) a source of current connected to said electrical current conductive means;
   (d) circuit means connected to said electrical current conductive means,
      (1) said circuit means including means for maintaining the internal temperature of said filament wound propellant container at a predetermined level by varying the amount of current applied to said electrical current conductive means by said source of current;
   (e) resistance sensing and indicating means associated and connectable with said current conductive means and said current source for sensing resistance variations in said current conductive means and thus monitoring pressure variations exerted on said filament wound container;
   (f) means for selectively connecting said resistance sensing means to said current conductive means and said current source.

3. A rocket motor system according to claim 2 wherein said circuit means further includes a second source of current, said source of current being of sufficient strength to vaporize said electrical current conductive means thereby destroying said filament wound propellant container; and remotely operated means for applying said second source of current to said electrical current conductive means.

4. A rocket motor system according to claim 3 wherein said second source to current includes a charged capacitor system.

References Cited

UNITED STATES PATENTS

| | | | |
|---|---|---|---|
| 2,519,920 | 8/1950 | Miner | 219—301 |
| 2,918,004 | 12/1959 | Denovan et al. | 60—253 |
| 2,987,334 | 7/1959 | McFarlane et al. | 219—311 X |
| 2,990,684 | 7/1961 | Cohen | 60—255 |
| 3,041,548 | 8/1962 | Keen et al. | 219—210 X |
| 3,028,473 | 4/1962 | Dyer et al. | 219—504 X |
| 3,181,464 | 5/1965 | Parks et al. | 102—28 |
| 3,167,014 | 1/1965 | Kopito | 102—28 |
| 3,245,018 | 4/1966 | Russell | 338—2 X |

RICHARD M. WOOD, *Primary Examiner.*

C. L. ALBRITTON, *Assistant Examiner.*